United States Patent [19]

Pralus

[11] Patent Number: 5,009,754

[45] Date of Patent: Apr. 23, 1991

[54] CONSUMPTION OF HYPOCHLORITE VALUES CONTAINED IN PERCHLORATE SOLUTIONS OF ELECTROLYSIS

[75] Inventor: Christian Pralus, Saint-Cyr-Au-Mont-d'Or, France

[73] Assignee: Atochem, Puteaux, France

[21] Appl. No.: 482,920

[22] Filed: Feb. 22, 1990

[30] Foreign Application Priority Data

Feb. 22, 1989 [FR] France ................. 89 02536

[51] Int. Cl.$^5$ .............................................. C25B 1/28
[52] U.S. Cl. .......................................... 204/82; 204/95; 210/759; 423/476
[58] Field of Search .......................... 204/82, 95, 129; 210/759; 423/476

[56] References Cited

U.S. PATENT DOCUMENTS 3,518,173 6/1970 Crane ................................. 204/82
4,075,094 2/1978 Carlson .............................. 210/756
4,888,099 12/1989 Welander et al. .................. 204/95

*Primary Examiner*—John F. Niebling
*Assistant Examiner*—David G. Ryser
*Attorney, Agent, or Firm*—Burns, Doane, Swecker & Mathis

[57] ABSTRACT

The objectionable hypochlorite values, $ClO^-$ ions, contained in a solution of an alkali metal perchlorate produced by the electrolysis of an aqueous solution of the corresponding chlorate of the alkali metal, are effectively destroyed (consumed) without adversely affecting the valence state of the hexavalent chromium values also contained therein, by intimately contacting such perchlorate solution with an effective amount of hydrogen peroxide such that the molar ratio available hydrogen peroxide/hypochlorites is at least one.

6 Claims, No Drawings

CONSUMPTION OF HYPOCHLORITE VALUES CONTAINED IN PERCHLORATE SOLUTIONS OF ELECTROLYSIS

CROSS-REFERENCE TO COMPANION APPLICATION

Copending application Ser. No. 07/482,929, filed concurrently herewith and assigned to the assignee hereof.

BACKGROUND OF THE INVENTION

1. Field of the Invention

The present invention relates to the destruction, or consumption, of hypochlorites or $ClO^-$ ions present in a perchlorate solution of an alkali metal, such as the solution of sodium perchlorate resulting from the electrolysis of an aqueous solution of the chlorate of said alkali metal, for example a solution of sodium chlorate, prior to the crystallization of the perchlorate values therefrom.

2. Description of the Prior Art

Except for allowing the perchlorate solution to remain in a so-called evolution reactor upon its withdrawal from the electrolysis cell for a period of time that is incompatible with the requirements of industrial production, it is known to this art that significant amounts of hypochlorite remain in such solution after evolution, to cause significant corrosion of the crystallizer, which typically is made of carbon or stainless steel.

It is also known to introduce additives into the perchlorate solutions, such as, for example, urea. But urea may form chloramines, which themselves are corrosive and which present the risk of explosion.

Thus, serious need continues to exist in this art for means other than mere passage of time or the above additives for destroying as completely as possible the hypochlorite values contained in a perchlorate solution prior to the crystallization of the perchlorate.

Although it is known that hydrogen peroxide reacts with $ClO^-$ ions, no process has to date been described for the destruction of such ions by means of $H_2O_2$ introduced into an alkali metal perchlorate solution emanating from the electrolysis of a chlorate solution of said alkali metal, in particular if hexavalent chromium is also present.

Hexavalent chromium, which, as is known to the art, makes it possible to minimize the phenomenon of cathodic reduction, should be retained in the loop to the extent possible in the electrolytic recirculation system for the production of perchlorate, both for economic and technical reasons. The hexavalent chromium is employed most typically in the form of a bichromate thereof, such as sodium bichromate.

In light of the great sensitivity of hydrogen peroxide, an ineffective destruction of the hypochlorites and/or the disappearance of the hexavalent chromium would be expected results, as in the case of, for example, the destruction of hypochlorites by sulfides soluble in water, as described in FR 2,168,530.

SUMMARY OF THE INVENTION

Accordingly, a major object of the present invention is the provision of an improved technique for the effective destruction of the $ClO^-$ ions in aqueous perchlorate solutions without adversely affecting the amount of hexavalent chromium concurrently present with the $ClO^-$ ions, by treating such aqueous perchlorate solutions with an effective $ClO^-$ consuming amount of hydrogen peroxide, and which improved technique conspicuously ameliorates those disadvantages and drawbacks to date characterizing the state of this art, particularly in regard to safety.

Briefly, the present invention features a process for the destruction of the hypochlorite values contained in a solution of a perchlorate of an alkali metal which is produced by the electrolysis of an aqueous solution of the chlorate of such alkali metal, without adversely affecting the valence state of the hexavalent chromium values also contained therein, by intimately contacting said perchlorate solution with an effective $ClO^-$ consuming amount of hydrogen peroxide, namely, an amount such that the molar ratio available hydrogen peroxide/hypochlorites is equal to or higher than 1.

DETAILED DESCRIPTION OF THE PREFERRED EMBODIMENTS OF THE INVENTION

More particularly according to the present invention, by the term "available hydrogen peroxide" is intended the hydrogen peroxide which is not consumed in the perchlorate solution in the absence of $ClO^-$ ions.

In order to determine the amount of hydrogen peroxide which may be consumed by compounds other than the perchlorites, metallic ions for example, the starting perchlorate solution of the invention can thus be used, after the $ClO^-$ ions have been essentially quantitatively eliminated therefrom, notably after a sufficiently long period of time of evolution of the initial perchlorate solution.

According to the present invention, it is typically unnecessary that the molar ratio available hydrogen peroxide/hypochlorites be greater than 1.1.

The hydrogen peroxide is advantageously used in the form of an aqueous solution thereof, for example a 50% by weight solution of hydrogen peroxide.

The process of the invention is of particular industrial value in the case of the production of sodium perchlorate.

This perchlorate solution in which the hypochlorites are to be destroyed may then contain, for example, per liter, approximately 500 g to 1,100 g sodium perchlorate, 5 g to 300 g sodium chlorate, up to 6 g sodium bichromate, $Na_2Cr_2O_7$, and an amount of $ClO^-$ ions corresponding to an amount of NaClO of up to 6 g.

The temperature and pH at which the destruction or consumption of the $ClO^-$ ions takes place are essentially the normal values of the perchlorate solution upon withdrawal from the electrolytic cell or the evolution reactor. For example, the pH, which could either be acid or alkaline, may range, for example, from 5 to 12, and the temperature, which may vary over rather wide limits, ranges, for example, from about 20° to 90° C., typically from 40° to 60° C.

The reactor for the destruction of the hypochlorites is of course preferably an agitated reactor, provided with venting means. It is fabricated, for example, from a material which may be based, e.g., on reinforced polyvinyl chloride.

The destruction of the hypochlorites is essentially complete according to the invention; the final $ClO^-$ ion content, expressed as NaClO, is typically less than about 10 mg/l, most often less than 2 mg/l.

The proper progress of the destruction of the hypochlorites may be observed vis-a-vis the value of the redox potential of the chlorate solution measured with a calomel reference electrode and a platinum measuring electrode.

The statement that the destruction of the hypochlorites does not adversely affect the hexavalent chromium signifies that the disappearance of the chromium having a valance of 6+ is negligible, generally less than 0.01% and often less than 0.005%.

In order to further illustrate the present invention and the advantages thereof, the following specific examples are given, it being understood that same are intended only as illustrative and in nowise limitative.

In said examples to follow, the initial sodium perchlorate solution was determined to be sufficiently free of impurities capable of interfering with the hydrogen peroxide in the absence of $ClO^-$ ions, such that the available hydrogen peroxide was identical with the hydrogen peroxide introduced.

EXAMPLE 1

A sodium perchlorate solution, produced by the electrolysis of an aqueous solution of sodium chlorate, contained, per liter: 1,055 g sodium perchlorate, 69.5 g sodium chlorate, 0.5 g hypochlorites expressed as NaClO, but no hexavalent chromium.

This solution was contacted, at pH 12, for 5 min and at 56° C. in an agitated reactor, with an amount of hydrogen peroxide in the form of a 50% by weight aqueous solution of hydrogen peroxide, such that the molar ratio hydrogen peroxide/hypochlorites was equal to 1.

The perchlorate solution resulting from the above operation contained less than 2 mg hypochlorites per liter, expressed as NaClO.

EXAMPLE 2

A solution of sodium perchlorate as described in Example 1 contained, per liter, the same amounts of sodium perchlorate and sodium chlorate, but in this example 3.6 g $ClO^-$ ions per liter, expressed as NaClO, and also 2.5 g hexavalent chromium, expressed as $Na_2Cr_2O_7$.

The solution was contacted, at a pH of 9.5 for 5 min and at 56° C. in an agitated reactor, with the hydrogen peroxide solution of Example 1, in a manner such that the molar ratio available hydrogen peroxide/hypochlorites was equal to 1.

The sodium perchlorate solution resulting from the above operation contained less than 2 mg $ClO^-$ ions per liter, expressed as NaClO, while approximately 0.01% of the hexavalent chromium was no longer in the indicated state.

EXAMPLE 3

The sodium perchlorate solution was as in Example 1 and contained, in addition to the indicated constituents, 2.5 g hexavalent chromium per liter, expressed as $Na_2Cr_2O_7$.

Utilizing the process and the conditions of Example 2 for contacting this solution with hydrogen peroxide, essentially the same results as in Example 2 were obtained relative to the disappearance of the $ClO^-$ ions and the preservation of the valence state of the hexavalent chromium in the final product perchlorate solution.

EXAMPLE 4

The procedure of Example 3 was repeated, but using a pH of 5.7 instead of 9.5.

The destruction of the $ClO^-$ ions effectively occurred, as in the preceding examples, and only about 0.005% of the hexavalent chromium was found not to be in this state in the final product sodium perchlorate solution.

EXAMPLE 5

A perchlorate solution containing the same amounts of sodium perchlorate, sodium chlorate and hexavalent chromium as the solution of Example 2, but containing 5 g $ClO^-$ ions per liter, expressed as NaClO, was contacted, at pH 5.5 for 5 min and at 56° C., with hydrogen peroxide according to the technique described in the preceding examples, but in this example establishing a molar ratio available hydrogen peroxide/hypochlorites of 1.1.

It was found that the effectiveness of the destruction of $ClO^-$ ions and the extent of the preservation of hexavalent chromium in such hexavalent state were essentially the same as in the other examples.

EXAMPLE 6

The procedure of Example 5 was repeated, except that the pH was 10 instead of 5.5. The same results as in Example 5 were obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the consumption of the hypochlorite values, $ClO^-$ ions, contained in a solution of an alkali metal perchlorate produced by electrolysis of an aqueous solution of a chlorate of said alkali metal, without adversely affecting the valence state of hexavalent chromium values also contained therein, comprising intimately contacting such perchlorate solution with an effective amount of hydrogen peroxide such that the molar ratio of available hydrogen peroxide/hypochlorites is at least one.

2. The process as defined by claim 1, said molar ratio of available hydrogen peroxide/hypochlorites being no greater than 1.1.

3. The process as defined by claim 1, carried out at either an acidic or alkaline pH.

4. The process as defined by claim 3, carried out at a pH ranging from 5 to 12.

5. The process as defined by claim 1, carried out at a temperature ranging from 20° to 90° C.

6. The process as defined by claim 1, said perchlorate comprising sodium perchlorate.

* * * * *